United States Patent
Mayer et al.

(10) Patent No.: US 6,866,688 B2
(45) Date of Patent: Mar. 15, 2005

(54) PROCESS TO MAKE HIGH-PURITY WET SALT

(75) Inventors: Mateo Jozef Jacques Mayer, Giesbeek (NL); René Lodewijk Maria Demmer, Enter (NL)

(73) Assignee: Akzo Nobel N.V., Arnhem (NL)

( * ) Notice: Subject to any disclaimer, the term of this patent is extended or adjusted under 35 U.S.C. 154(b) by 249 days.

(21) Appl. No.: 10/174,846

(22) Filed: Jun. 19, 2002

(65) Prior Publication Data

US 2003/0009857 A1 Jan. 16, 2003

Related U.S. Application Data

(60) Provisional application No. 60/303,903, filed on Jul. 9, 2001.

(51) Int. Cl.$^7$ .................................. B01D 9/00
(52) U.S. Cl. ....................... 23/300; 23/295 R
(58) Field of Search ............... 23/300, 295 R, 23/296

(56) References Cited

PUBLICATIONS

Patent abstracts of Japan abstracting Patent No.: JP 01–145320, Jul. 1989.
Laid Open Patent No. 1989–JP 01–145319, Jul. 1989.

*Primary Examiner*—Stanley S. Silverman
*Assistant Examiner*—Edward M. Johnson
(74) *Attorney, Agent, or Firm*—Richard P. Fennelly; Ralph J. Mancini

(57) ABSTRACT

The invention relates to an evaporative crystallization process to make salt compositions that includes a step wherein a mother liquor is formed that contains an effective amount of a crystal growth inhibitor that is selected from oligopeptides, polypeptides, and polymers bearing two or more carboxylic acid groups or carboxyalkyl groups and optionally further phosphate, phosphonate, phosphino, sulfate, and/or sulfonate groups, such as carboxymethyl cellulose with phosphate groups, to form salt crystals with a (111) face. The salt can be washed with a reduced amount of washing water while still containing lower amounts of K, Br, $SO_4$, and/or Ca. A wet salt can be obtained by partially drying the salt crystals that are formed.

10 Claims, No Drawings

PROCESS TO MAKE HIGH-PURITY WET SALT

The present application claims priority of U.S. provisional application No. 60/303,903 filed on Jul. 9, 2001.

FIELD OF THE INVENTION

The present invention relates to a process to make salt (sodium chloride) of high purity, as well as to the use of resulting high-purity, preferably wet, salt to make brine, a solution of said salt in water, for electrolysis operations, preferably the electrolysis process involving membrane cells.

BACKGROUND OF THE INVENTION

Salt and wet-salt is long known. The conventional process to make said salt is an evaporative crystallisation of brine, followed by washing and drying steps. Said brine is typically produced by dissolving a natural source of NaCl in water. The brine will also contain K, Br, $SO_4$, and/or Ca, which moieties are typically present in the source of NaCl. A disadvantage of the conventional process is that the salt obtained has imperfections in the crystal lattice and contains occlusions, being small pockets of mother liquor of the evaporative crystallisation process (present in cavities in the salt crystals). Due to these imperfections and occlusions, the wet salt, and the brine produced therefrom, is contaminated with compounds present in the mother liquor. In particular, the amount of K, Br, $SO_4$, and/or Ca that is carried over is quite high. Hitherto, additional washing steps and drying steps, such as centrifuge steps, were employed, which are energy consuming, to reduce the levels of the contaminants.

When brine produced from the wet salt is employed in the modern membrane electrolysis cells, such contaminants can cause significant problems and lead to less economic electrolysis operations.

For these reasons, there is a need for improved wet salt, having a lower level of contaminants, which can be produced more cost-effectively and which can be used to make a brine for electrolysis processes. Surprisingly, the present inventors have found that wet salt compositions can be produced with a reduced level of K, Br, $SO_4$, and/or Ca and using less energy in the washing operations.

SUMMARY OF THE INVENTION

The present invention generally relates to a process to make salt (sodium chloride) of high purity, as well as to the use of resulting high-purity, preferably wet, salt to make brine, a solution of said salt in water, for electrolysis operations, preferably the electrolysis process involving membrane cells. The claimed process includes a step wherein a mother liquor is formed that contains an effective amount of a crystal growth inhibitor that is selected from oligopeptides, polypeptides, and polymers bearing two or more carboxylic acid groups or carboxyalkyl groups and optionally further phosphate phosphonate, phosphino, sulfate, and/or sulfonate groups, such as carboxymethyl cellulose with phosphate groups, to form salt crystals with a (111) face.

DETAILED DESCRIPTION OF THE INVENTION

The process for making a high-purity wet salt composition in accordance with the present invention is characterized in that during the evaporative crystallization process, the mother liquor contains an effective amount of a crystal growth inhibitor that is selected from oligopeptides, polypeptides, and polymers bearing two or more carboxylic acid groups or carboxyalkyl groups and optionally further phosphate, phosphonate, phosphino, sulfate, and/or sulfonate groups, such as carboxymethyl cellulose with phosphate groups, to form salt crystals with a (111) face. Said salt can be washed with a reduced amount of washing water while still containing lower amounts of K, Br, $SO_4$, and/or Ca. A wet salt can be obtained by partially drying the salt crystals that are formed.

Preferably, the crystal growth inhibitor is a water-soluble polymer. More preferably, it is a water-soluble polymer bearing two or more carboxylic acid groups and optionally further phosphate, phosphonate, phosphino, sulfate, and/or sulfonate groups, such as polyacrylates. If the final salt is to be used in electrolysis operations the use of peptides is less desired, since the nitrogen of the peptide can result in the formation of the highly undesired $NCl_3$ in said electrolysis process. Peptides that hydrolyze in the crystallization process to the extend that they become ineffective crystal growth inhibitors are also less preferred. However, for table salt, peptides may be acceptable. If residual crystal growth inhibitor in the final salt is undesired, then the use of hydrolyzing peptides can be preferred since the final salt, optionally after a washing step, can be free of the crystal growth inhibitor. It is noted that it is known that adding certain chemicals to the evaporative process can influence the crystal form of the salt and can influence the formation of occlusions in the salt. Lead chloride, cadmium chloride, manganese sulfate and carrageen in, for instance, have been reported to reduce the amount of cavities, and consequently the amount of occlusions and occluded mother liquor, when added to the evaporative crystallizing mass. However, such chemicals are undesired. Not only can they adversely affect the electrolysis operations, they may also spill over in table-salt that is produced using the same installation, which is typically undesired.

The term wet salt is used to denominate "predominantly sodium chloride" containing a substantial amount of water. More particularly, it is a water-containing salt of which more than 50% by weight consists of NaCl. Preferably, such salt contains more than 90% by weight of NaCl. More preferably, the salt contains more than 92% of NaCl, while a salt being essentially NaCl and water is most preferred. The wet salt will contain more than 0.5, preferably more than 1.0, more preferably more than 1.5% by weight of water. Preferably it contains less than 10% by weight, more preferably less than 6% by weight and most preferably less than 4% by weight of water. Typically the salt will contain 2–3% of water. All of the weight percentages given are based on the weight of the total composition.

An effective amount of the crystal growth inhibitor is present if in the following test any crystals with a (111) face show up. More particularly, to determine whether enough crystal growth inhibitor is present, one adds a certain amount of the crystal growth inhibitor to a glass beaker of 1000 ml, equipped with a magnetic stirrer bar, and containing 450 ml of demineralized water and 150 g of high-purity NaCl (pharmaceutical grade). The beaker is covered with a glass plate, but the covering is such that the gas phase inside the beaker is in direct unrestricted contact with the air. The beaker is then heated till reflux conditions (about 110° C.). The heat input is selected such that within a period of 15 to 60 minutes about 2 to 10 g of salt is crystallized. The crystals are separated from the mother liquor, e.g. by centrifuging, and dried. For this test the level of drying is not crucial, as long as the crystals are not (re)dissolved or altered, e.g. by mechanical forces. If analysis by means of a (light) microscope shows crystals with (111) faces, a sufficient amount is used.

Preferably the amount of crystal growth inhibitor that is present in the feed of the evaporative crystallization process is less than 300 mg/kg for economic reasons. Typically more than 10 mg, preferably more than 12.5 mg, and most preferably more than 14 mg crystal growth inhibitor is used per kg of feed of the evaporative crystallization process.

It is noted that JP-A-01-145319 and JP-A-01 145 320 describe the use of sodium hexametaphosphate and polyacrylate, respectively, in an evaporative crystallisation process to make dried polyhedral salt with an improved flowability that can be used to improve the marketing of product to which the dried salt is fixed. Said dried salt is known to contain less than 0.5% of water. There is no disclosure that one of these chemicals can be used to make wet salt with less occlusions in a more economic way. Furthermore, the sodium hexametaphosphate was proven not to be suitable in the presently claimed evaporative crystallisation process for making wet salt sue to hydrolysis of said hexametaphosphate.

It is furthermore noted that products like Belsperse® 164, which is a phosphino carboxylic polymer ex FMC Corporation, have been promoted for use as an anti-scaling additive in evaporative crystallizers. The product is typically used in an amount of 1–2 ppm, although a level up to 10 ppm has been mentioned. However, such a concentration is not an effective amount in accordance with the present invention.

Experimental

In this experiment, a variety of crystal growth inhibitors, amongst which Belsperse® 164, were evaluated. Adding 25 mg/kg of Belsperse® 164 to the feed resulted in the formation of NaCl crystals with (111) faces, while at the same time K, Br, $SO_4$, and Ca levels in the resulting crystals was lowered by more than 20%, compared to the levels in salt produced from the same feed under the same conditions, without that the Belsperse® 164 was added. Said lowering of the K, Br, $SO_4$, and Ca levels is attributed to less occluded mother liquor and a lower amount of lattice imperfections. Also it was found that washing of the product was more efficient, so that the amount of wash water could be reduced. Furthermore, the centrifuge time to separate the wet salt from the wash water could be reduced, resulting in energy savings during washing and centrifuging of more than 1%.

The wet salt so obtained was preeminently suited for use in electrolysis processes since it required hardly any purification. This is of particular importance for electrolysis operations wherein membrane cells are used. Furthermore it was observed that the wet salt could be submitted to an extra drying step to make the known high-purity dried salt. Such high-purity dried salt can, for example, be used as a pharmaceutical grade salt.

In further tests, Belsperse® 164 was added to a conventional continuous 4 effects vacuum salt production plant in an amount of 15 g per cubic meter of brine.

Compared to a production run that was equal except for the Belsperse® 164 addition, the quality of the resulting wet salt (samples were taken at regular intervals from the production line) was improved as follows:

Br content from 25 to 38% lower
$SO_4$ content from 30 to 60% lower
K content from 29 to 37% lower
Ca content from 27 to 50 lower.

We claim:

1. A process for the evaporative crystallization of high purity salt compositions from a mother liquor which comprises brine, said process comprising adding an effective amount of a crystal growth inhibitor to said mother liquor, wherein said crystal growth inhibitor is selected from oligopeptides, polypeptides, and polymers bearing at least two carboxylic acid groups, carboxyalkyl groups and combinations thereof and optionally at least one phosphate group, phosphonate group, phosphino group, sulfate group, sulfonate group, or mixtures thereof, wherein said effective amount is effective to form salt crystals with a (111) face, followed by evaporative crystallization thereby forming a high purity salt composition.

2. The process of claim 1 wherein said high purity salt composition is subjected to a washing step.

3. The process of claim 1 wherein said high purity salt composition is subjected to a drying step wherein said salt is only partially dried, thereby forming a wet salt.

4. The process of claim 3 wherein said wet salt less than 10% by weight water.

5. The process of claim 4 wherein said wet salt contains less than 4% by weight water.

6. The process of claim 1 wherein said crystal growth inhibitor is carboxymethyl cellulose with phosphate groups.

7. The process of claim 1 wherein less than 300 mg but more than 10 mg of crystal growth inhibitor per kg of mother liquor is employed.

8. The process of claim 7 wherein more than 12.5 mg of crystal growth inhibitor per kg of mother liquor is employed.

9. The process of claim 8 wherein more than 14 mg of crystal growth inhibitor per kg of mother liquor is employed.

10. The process of claim 1 wherein said high purity salt composition is subjected to a drying step thereby forming a dried salt.

* * * * *